Aug. 7, 1928.
R. B. FAGEOL
TOY VEHICLE
Filed March 17, 1926 — 3 Sheets-Sheet 1
1,679,819
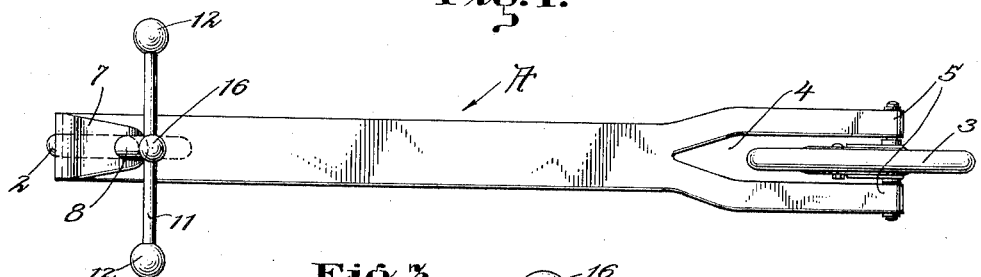
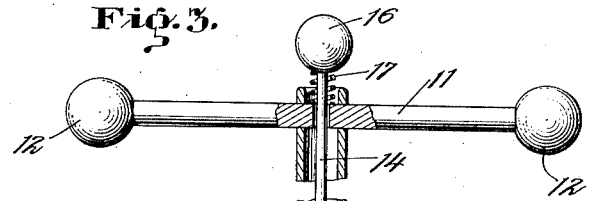
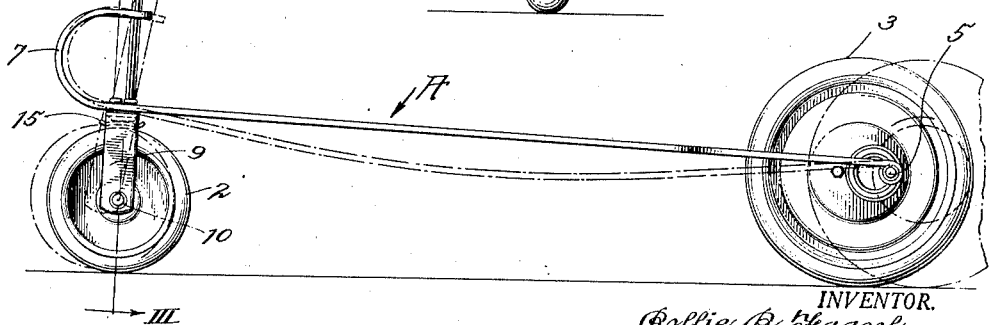
INVENTOR.
Rollie B. Fageol
BY
Townsend, Loften & Afflett
ATTORNEYS.

Aug. 7, 1928.

R. B. FAGEOL 1,679,819

TOY VEHICLE

Filed March 17, 1926

INVENTOR.
Rollie B. Fageol
BY
Townsend, Loftus & Abbott
ATTORNEYS.

Aug. 7, 1928.  R. B. FAGEOL  1,679,819
TOY VEHICLE
Filed March 17, 1926   3 Sheets-Sheet 3

INVENTOR.
Rollie B. Fageol
BY
Townsend Loftus & Affett
ATTORNEYS.

Patented Aug. 7, 1928.

1,679,819

UNITED STATES PATENT OFFICE.

ROLLIE B. FAGEOL, OF LOS ANGELES, CALIFORNIA.

TOY VEHICLE.

Application filed March 17, 1926. Serial No. 95,208.

This invention relates to toy vehicles such as scooters or the like used by children and particularly to a type of vehicle which will be referred to as a "galloping scooter".

The object of the present invention is to generally improve and simplify the construction and operation of toy vehicles such as used by children, to provide a vehicle which will promote amusement and exercise, to provide a substantially all resilient steel spring frame structure whereby a galloping motion may be imparted and a new and novel effect obtained when riding the vehicle, and further, to provide means whereby a galloping movement may be transmitted to propel the vehicle.

The invention is illustrated by way of example in the accompanying drawings, in which—

Fig. 1 is a plan view of the "galloping scooter".

Fig. 2 is a side elevation of the same.

Fig. 3 is a section through the front wheel and fork taken on line III—III, Fig. 2.

Figure 4:
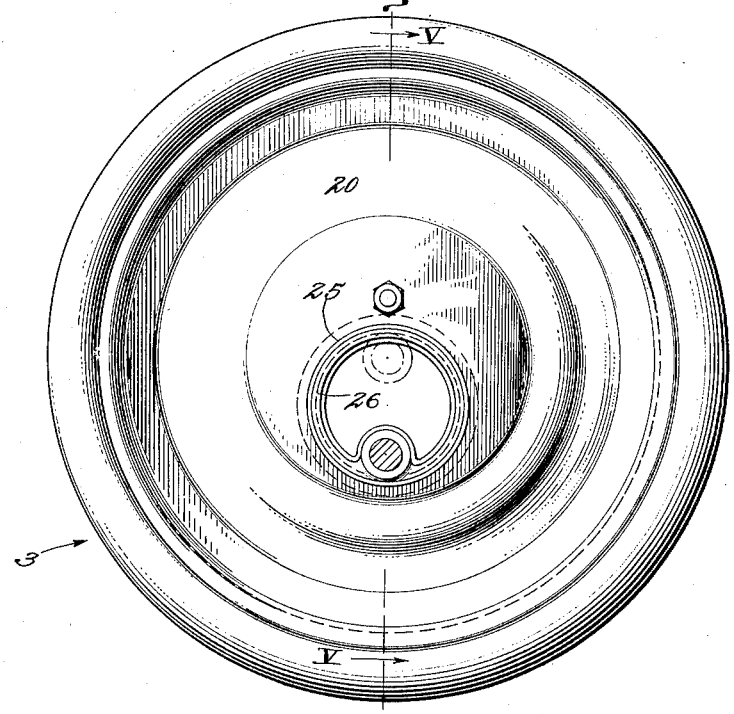
Fig. 4 is an enlarged side elevation of the rear eccentric propelling wheel.

Referring to the drawings in detail and particularly to Figs. 1 and 2, A indicates the bed or main frame member of the vehicle and 2 and 3 front and rear wheels, respectively, whereby the frame is supported and propelled. The frame member is elongated as shown and is preferably constructed of spring steel. It is comparatively thin and its width as shown in plan view is just sufficient to receive the foot of the child operating the same. The rear end of the spring frame member is forked as indicated at 4 and the fork members terminate in eyes 5 to receive and secure an axle 6.

The forward end of the spring frame member is bent to form a spring tongue 7 and this tongue forms a journal member and support for a steering post 8 and a fork 9 the lower end of which carries an axle 10 on which the front wheel 2 is journalled. The steering post is provided with a cross- or steering-bar 11 and its upper end terminates in knobs 12 whereby the bar may be grasped to steer the vehicle and also to impart a rocking movement to the post as indicated by dotted lines at 13. The post is hollow and a rod 14 extends therethrough. This rod extends downwardly between the forks 9 and terminates in a brake shoe 15 which is adapted to engage the surface of the front wheel 2 to break the forward movement of the vehicle whenever desired. The upper end of the rod terminates in a ball 16 and a releasing spring 17 is disposed between the steering post 8 and the knob to normally maintain the brake shoe 15 in elevated position.

Figure 5:
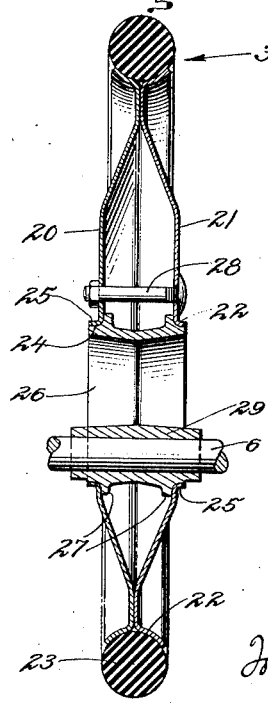
Fig. 5 is a cross-section on line V—V, Fig. 4.

By referring to Figs. 2, 4 and 5 it will be noted that the axle 6 is eccentrically positioned with relation to the wheel 3, and it will further be noted that the eccentric position of the axle may be adjusted so as to give any degree of eccentricity desired. This is accomplished as follows:

The rear wheel 3 is of a disk-wheel type. It consists of two disks 20 and 21 which are provided with a rib section 22 to receive a rubber tire 23. Formed concentrically of the disks is an opening 24 which is flanged on opposite sides as at 25 to receive a hollow eccentric bushing 26, this bushing being secured against lateral movement by internal annular flanges such as shown at 27. The disks are spot welded or otherwise secured with relation to each other, but the eccentric is, practically speaking, free to rotate within the openings 24. A clamping bolt 28 is, however, employed to pull the disks against the annular flanges 27 and thereby to secure the eccentric member against rotation, this bolt also permitting rotation of the eccentric so as to adjust the position of the axle 7 with relation to the wheel. The eccentric carries a bearing member 29 through which the axle 6 extends. Thus, by rotating the eccentric and the bearing member carried thereby with the openings in the disks when the clamping bolt 28 is released, it is possible to obtain any throw or degree of eccentricity desired, the degree of eccentricity employed depending upon the size or weight of the child.

When the proper adjustment has been made the bolt is tightened and a permanent adjustment is obtained. In actual operation the galloping scooter is operated and propelled in the following manner—

After the scooter is put in motion by a child standing in the center of the resilient spring frame A with one foot, and pushing with the other foot in the usual manner, the vehicle is kept in motion by pulling the steering post backwards, as indicated by dotted lines at 13 and at the same time throwing the body weight on the spring frame when the axle is starting down, or on its forward throw of eccentricity as shown by dotted lines in Fig. 2 and then springing upward to relieve the weight when eccentric is acting upward on the axle, and at the same time letting the steering post spring forward. This motion, is, of course, continuously repeated and a galloping movement is obtained which promotes both amusement and exercise to the child operating the same. A spring or galloping motion is also obtained when coasting down hill.

The vehicle is of the two-wheel type as a single front and rear wheel is employed and a certain amount of balancing is accordingly necessary. The vehicle is steered in the usual manner by turning the steering bar 11 and curves and corners may thus be taken at will. The brake may be applied at any time by merely pushing downwardly on the knob 16.

Figure 6:
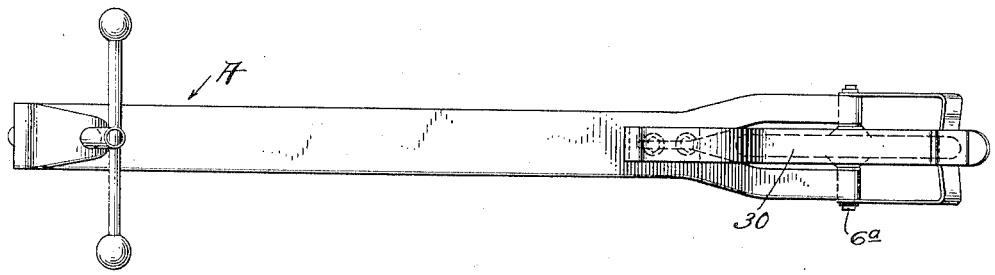
Fig. 6 is a plan view of a modified form of the scooter.
Figure 7:
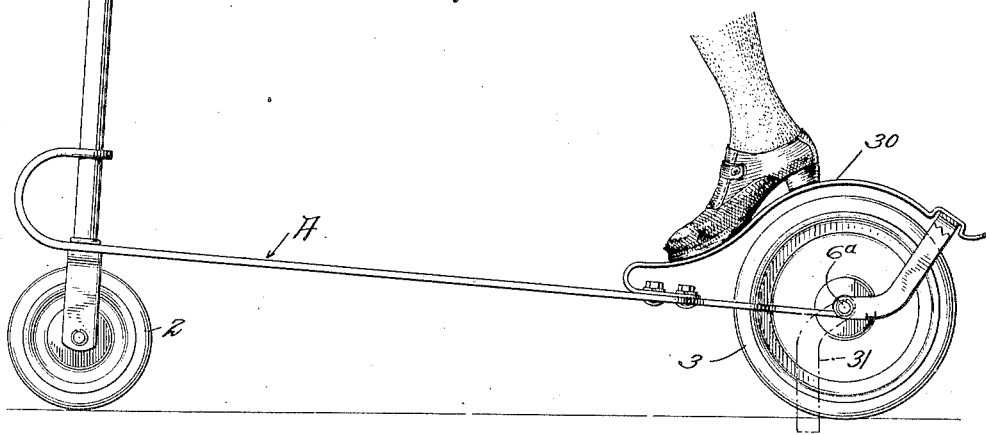
Fig. 7 is a side elevation of the same.

By referring to Figs. 6 and 7 it will be noted that a modified form of brake mechanism is employed. In this instance a spring steel brake and wheel guard is employed as indicated at 30. One foot may be placed thereon and braking action obtained whenever desired. The wheel guard pivots on the axle 6ª and may be swung to the dotted line position shown at 31 if it is desired to raise the rear wheel off the ground and at the same time to support the vehicle in an upright position just as one would do in the case of a motorbicycle. The eccentric propelling mechanism may or may not be employed in this type of vehicle as desired.

Having thus described my invention what I claim and desire to secure by Letters Patent is:—

1. A toy vehicle of the class described comprising a running gear, a vertically yieldable spring bar constituting the bed of said vehicle and being mounted at opposite ends of the running gear, and means whereby yielding movement of the spring bar is transmitted to propel the vehicle.

2. In a toy vehicle of the class described an elongated vertically yieldable spring bar forming the bed of the vehicle, front and rear wheels supporting the spring bar, and means whereby springing movement of the bar is transmitted to rotate the rear wheel.

3. In a toy vehicle of the character described an elongated vertically yieldable spring bar forming the bed of the vehicle, front and rear wheels supporting the spring bar, and an axle carried by the rear end of the spring bar upon which the rear wheel is journalled.

4. In a toy vehicle of the character described an elongated vertically yieldable spring bar forming the bed of the vehicle, front and rear wheels supporting the spring bar, and an axle carried by the rear end of the spring bar upon which the rear wheel is journalled, said wheel being eccentrically positioned on the axle, and means for increasing or decreasing the eccentricity of the wheels with relation to the axle.

5. In a toy vehicle of the character described an elongated vertically yieldable spring bar forming the bed of the vehicle, a steering post secured at the forward end of said bar, a fork on the lower end of the post, a steering wheel journalled in said fork, a steering bar at the upper end of the post whereby the post may be pulled rearwardly to flex the spring bar, a fork-shaped extension on the rear end of the spring bar, an axle secured between the forks and a propelling wheel journalled on said axle.

6. In a toy vehicle of the character described an elongated vertically yieldable spring bar forming the bed of the vehicle, a steering post secured at the forward end of said bar, a fork on the lower end of the post, a steering wheel journalled in said fork, a steering bar at the upper end of the post whereby the post may be pulled rearwardly to flex the spring bar, a fork-shaped extension on the rear end of the spring bar, an axle secured between the forks and a propelling wheel journalled on said axle and eccentrically positioned with relation thereto.

7. In a vehicle of the character described, a propelling wheel, a hub member concentrically positioned therein, a bearing member in said hub and eccentric with relation to the hub, and means for securing the hub against rotation in the wheel said means when released permitting a circumferential adjustment of the hub to turn the eccentric bearing member from the position central of the wheel to an eccentric position with relation to the wheel.

8. In a vehicle, spaced wheels and a body of spring metal connecting said wheels extensible by flexing to advance said wheels to propel said vehicle.

9. In a vehicle, spaced wheels and axles therefor and a flexible element connecting said axles extensible to advance said wheels to propel said vehicle.

ROLLIE B. FAGEOL.